Patented Aug. 11, 1936

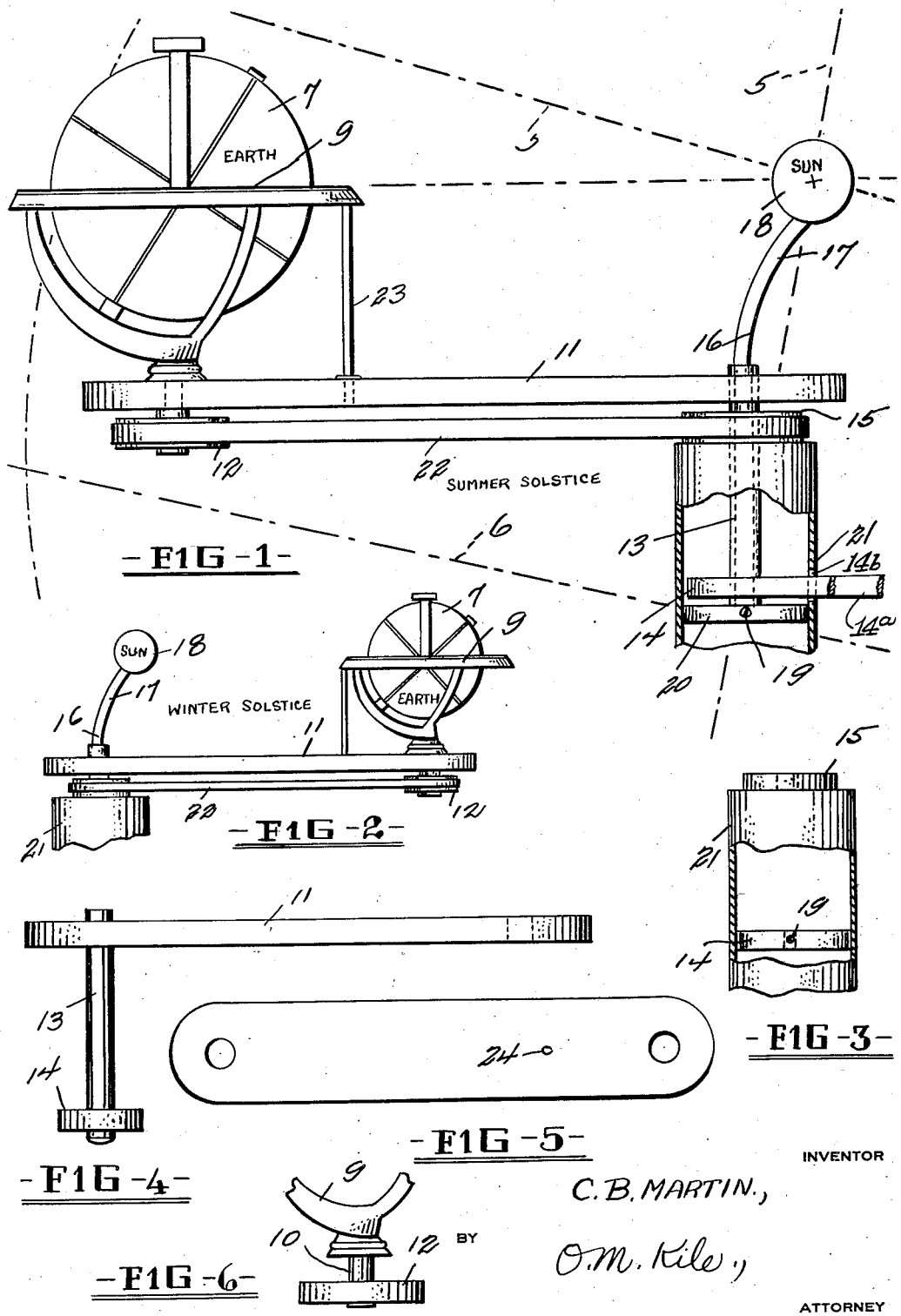

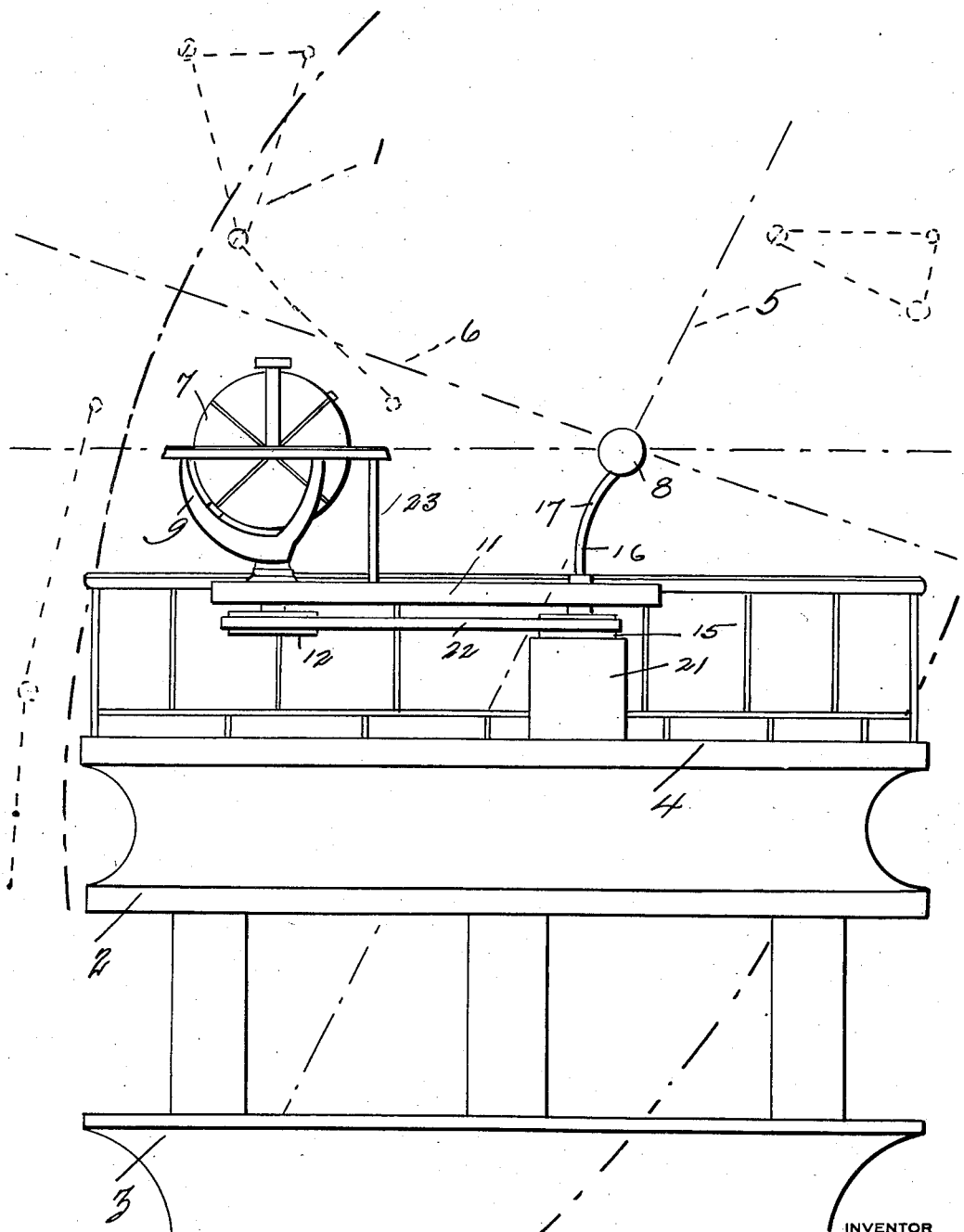
FIG-2-

2,050,351

UNITED STATES PATENT OFFICE 2,050,351

PLANETARIUM

Charles B. Martin, Los Angeles, Calif.

Application January 14, 1935, Serial No. 1,806

2 Claims. (Cl. 35—45)

My present invention, in its broad aspect, has to do with improvements in mechanical means for visualizing and demonstrating the relationship and relative movements of the planets, and other solar bodies, and the sun and the earth, and is an improvement over my prior Patent #854,513 granted May 21st, 1907. More particularly it is my purpose to arrange and coordinate in a mechanical organization representations of the sun, and the earth, and apply to them relative movements such as these bodies assume in reality, so that persons may actually witness in miniature the relationship and movements of these bodies in a universe.

In my prior Patent #854,513 hereinbefore referred to there is shown and described a tellurian comprising a sphere representing the earth, a ring having the usual graduations of the zodiac, and a demonstrating device having a graduated ring mounted to turn on the zodiac ring, and a representation of a moon and a sun each mounted to turn so that the solar day, the sideral day, the lunar day, the month, the days of the month, the signs of the zodiac, the seasons, the degrees, the globe's orbit, the equinoctial days, and the summer and winter solstices can be readily shown, and at the same time giving day and night and the variations of the length of day and night from day to day. My present invention is an improvement upon my prior patented apparatus and is designed to accomplish the same purposes and ends through a slightly different mechanism; and in my present invention the tellurian which is carried on the arm and in the frame and zodiac ring which is a fixed part of the frame and is held in respect to the outer sphere by the pulley provided. In the present improvement the terrestrial globe has the geographical and physical divisions of the earth, so that by means of the celestial globe the exact spot of the sun's direct rays can be demonstrated for every day in the year and every hour in the day; at the same time it shows the exact spot where our sun appears in our heavens for every day in the year. The celestial globe used with the present invention is a large hollow sphere with geometrical divisions making it possible to place the stars of the first magnitudes in their relative positions; the result is a miniature reproduction of the heavens as seen by night.

My invention has many practical uses as an instrument of education and research; and it is sufficiently practical and inexpensive to find a place in schools and colleges, at fairs and other public demonstrations and the like, and it has the advantage of teaching and demonstrating clearly the phenomena of celestial organization and movement which is difficult to explain to the lay mind.

Other and equally important advantages and objects of my invention will be apparent as the detailed description of the same proceeds in conjunction with the drawings which form a part of this application, and in which:—

Figure 1 is a side elevation, partly broken away, of the mechanical organization of the earth and the sun, showing their positions during the summer solstice and the means whereby these two bodies are caused to assume their proper movement with respect to each other;

Figure 2 is a view similar to Figure 1, but smaller, and shows the sun and the earth in the positions which they occupy during the winter solstice;

Figure 3 is a detail side elevation, partly broken away, of my supporting standard;

Figure 4 is a detail view of the revolving arm organization and shaft for actuating the same;

Figure 5 is a plan view of the revolving arm;

Figure 6 is a detail view of the earth sphere base and pulley, and

Figure 7 is an assembly view showing the platform on which my device is usually carried, with a representation of a celestial organization shown in dotted lines.

In the drawings wherein like or similar characters of reference are used to designate like or similar parts;—

The numeral (1) designates a representation of the celestial organization or globe which is a hollow sphere with geometrical divisions making it possible to place the stars of the first six magnitudes in their relative positions, since these are the stars that can be seen with the naked eye. As the sun and earth travel through their orbits (in the manner which will be hereinafter described) the relationship between these and the principal constellations and planets can be visualized. For instance in the twelve principal constellations there are the most interesting stars, such for instance as those more than 300 times larger than the sun, stars so far away that it takes 500 years for their light to reach our earth notwithstanding that light travels at the rate of 186,000 miles a second. This outer globe is represented in dotted lines since it does not form a part of the mechanical organization of the tellurian set-up of the present invention, and it is designed to be mounted about the platform (2) with its supporting base (3) and railed enclosure (4) on the top on which my present apparatus is mounted.

The earth (7) or terrestrial globe carries the geographical and physical geographical divisions of the earth. The sun (8) is so mounted with respect to the earth that when my apparatus is in operation it is possible to show with approximate accuracy the exact spot where the direct rays strike the earth at any given time, together with the exact point where the sun appears in our heavens each day in the year and each hour in the day. The earth as shown is mounted in the frame (9) and there is provided a zodiac ring having graduations which is also a fixed part of the frame and a rod vertically rising from the arm (hereinafter described) carrying the frame. By locating the sun's position on the outer celestial organization (shown in dotted lines) which represents the heavens and wherein the stars are shown, it is very simple to locate the exact spot overhead for every hour in the day and for every day in the year.

The sphere representing the earth revolves freely in the frame (9) to demonstrate the rotational movement of the earth, and this frame has a shaft (10) extending downwardly through the arm (11) and terminating in pulley (12). The arm (11) is rotationally mounted on a vertical shaft (13) carrying a pulley (14) and belt (14a) cooperating with a prime mover or other actuating unit provided, but which is not here shown. Shaft (13) is hollow, and rising therethrough is a fixed standard (16) having a curved upper end (17) on which a smaller sphere representing the sun (18) is carried. The upper end of vertical stand (21) has formed thereon a fixed extension serving as a fixed pulley (15) which cooperates with and is connected with the pulley (12) by a belt (22). A vertical rod (23) set in opening (24) in arm (11) contacts the zodiac ring which is a part of frame (9) and functions as a guide for the same and a pointer; said zodiac ring being graduated and supplied with data from the American Ephemeris and Nautical Almanac; rod (23) is therefore a guide for rim of the frame (9) of the earth (7) and a pointer.

The operation of my invention is as follows; the stand (21) is fixed and carries the fixed pulley (15); the standard (19) carrying the sun is also fixed by bolting or keying the same to the partition in the stand (21). The hollow shaft (13) revolves about the fixed standard which is the center of the rotational movement, and revolving motion is imparted to it through the pulley (14) and belt (14a) which is connected with a small motor or other suitable power plant not shown there being slots (14b) in the side of the stand (21) through which belt (14a) extends. Since the arm (11) revolves about the fixed standard carrying the sun and the belt (22) does not revolve by reason of its attachment to the fixed pulley, the belt transmits to the pulley (12) to which it is connected a rotational movement which is transmitted to the earth sphere (7) so that seasonal changes in the relationship of certain parts of the earth with the sun are approximated. It will be noted that the upper end of the fixed standard is curved as at (17) so that when the earth (7) has reached certain stages in its path about the sun the sun is nearer to the earth than it is at certain other seasons of the year. From the foregoing it is believed that the operation and construction of my invention will be apparent, but it is to be understood that changes may be permitted in arrangement, size, shape, and formation of the parts, provided such changes fall within the scope of what is claimed.

I claim:—

1. A planetarium comprising a hollow, fixed supporting stand formed with a reduced annular upper end adapted to serve as a fixed pulley, said stand having a transverse partition, a vertical standard fixed to said partition and rising through the upper end of the stand and formed with a laterally curved upper end, a ball representing the sun carried on the curved end, a hollow shaft rotatably mounted on said standard, an arm on said hollow shaft, a frame provided with a zodiac ring rotatably mounted on the free end of the arm, a sphere adapted to represent the earth carried by the frame, a pulley connected with the frame and disposed below the arm and in substantial alignment with the fixed pulley on the stand, and a belt connecting said pulleys whereby when said arm is rotated, rotational movement will be imparted to the frame.

2. A planetarium comprising a cylindrical, hollow, fixed stand formed with a reduced annular upper end adapted to serve as a fixed pulley, said stand having a transverse partition, a vertical standard fixed to said partition and rising through the upper end of the stand and formed with a laterally curved upper end, a ball representing the sun carried on the curved end, a hollow shaft rotatably mounted on said standard, an arm on said hollow shaft, a frame having a zodiac ring rotatably mounted on the free end of the arm, a sphere adapted to represent the earth rotatably carried by the frame, a pulley connected with the frame and disposed below the arm and in substantial alignment with the fixed pulley on the stand, a belt connecting said pulleys whereby to impart rotational movement to the frame when the arm is rotated, and a vertically positioned rod on the free end of the arm between the earth and the sun and contacting the under face of the zodiac ring for the purpose defined.

CHARLES B. MARTIN.